Figure 1:
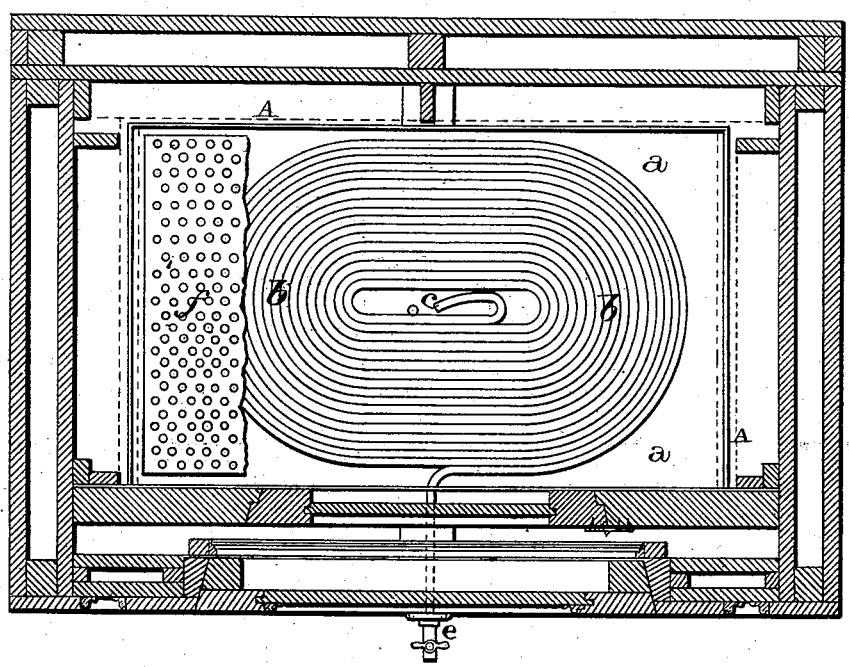

(No Model.)  2 Sheets—Sheet 1.

G. C. HODGDON.
LIQUID COOLING APPARATUS.

No. 261,453.  Patented July 18, 1882.

Witnesses:  Inventor:

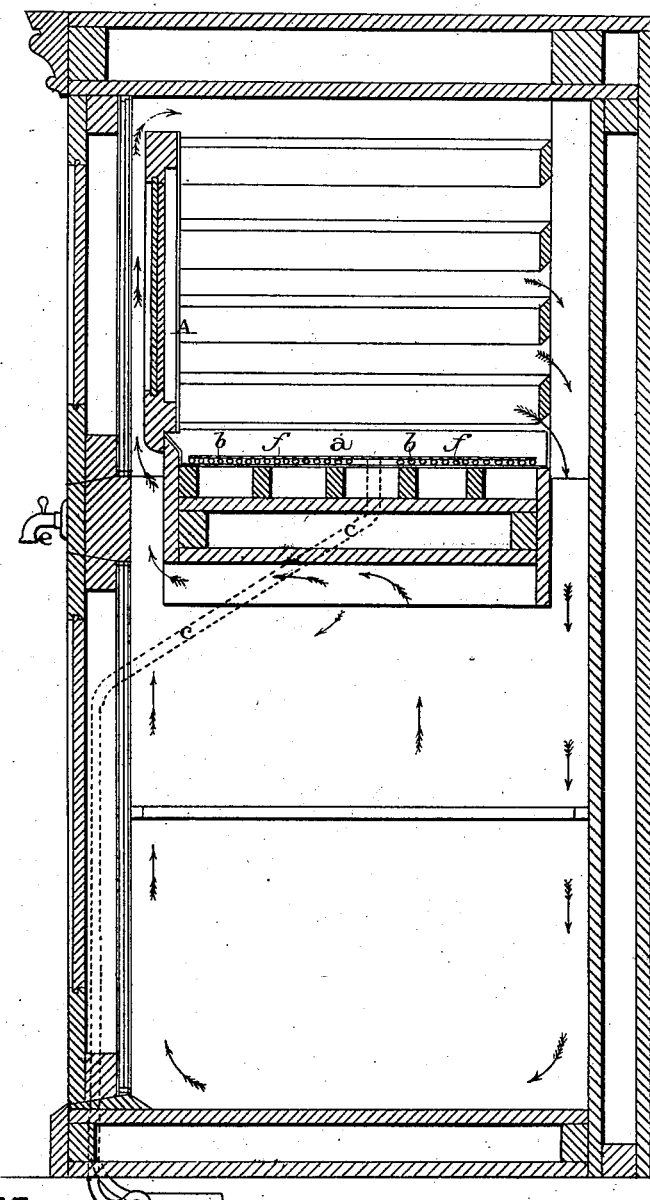

UNITED STATES PATENT OFFICE.

GEORGE C. HODGDON, OF ALLEGHENY, PENNSYLVANIA.

LIQUID-COOLING APPARATUS.

SPECIFICATION forming part of Letters Patent No. 261,453, dated July 18, 1882.

Application filed December 31, 1881. (No model.)

*To all whom it may concern:*

Be it known that I, GEORGE C. HODGDON, a citizen of the United States, residing at Allegheny, in the county of Allegheny and State of Pennsylvania, have invented certain new and useful Improvements in Apparatus for Cooling Liquids, of which the following is a specification, reference being had therein to the accompanying drawings.

My invention relates to an improvement in apparatus for cooling liquids in a refrigerator; and it consists in the introduction of a flat coil of metal pipe in the bottom of the ice-pan of the refrigerator, which coil, containing the liquid to be cooled, is connected with an induction and an eduction pipe, the former attached to the reservoir furnishing the liquid, the latter for drawing the liquid from the coil, as will be fully described hereinafter.

It has heretofore been the custom to place vessels containing the liquids to be cooled near or in contact with the ice in the ice-chamber of the refrigerator. There are inconveniences connected with this, since there is frequently a want of space for pitchers or other vessels to be placed, and when greater quantities of cooled liquids are needed the room required for the vessels containing them is entirely too limited. The frequent opening and shutting of the ice-chamber for removing vessels or placing them inside is also an objection, for the temperature within the refrigerator is raised whenever the door is opened. Others have introduced pans for holding the liquid to be cooled, placing them under the ice-tray; but this also is found objectionable on account of the necessarily limited space in the pans to contain the liquids, and also on account of the loss of carbonic-acid gas from fermented beverages, that unavoidably occurs during the transfer from casks or other vessels to the pans. There is also the danger of bursting such pans by pressure of the water when connected with hydrants or main water-supply of the house. Again, others have introduced pipes standing around the sides of the ice-chamber; but in this arrangement the cooling effect of the ice is very slow and the pipes are in danger of being injured by the sharp corners of the ice falling against them.

My object has been to furnish an apparatus by which an unlimited quantity of water or other liquids can be cooled without opening the door of the refrigerator or in any manner interfering with its interior, and at the same time so arrange it as to occupy the least possible space, easily to be removed when required, and fully protected from injury of the ice. This is attained by connecting an induction-pipe directly with the reservoir that furnishes the water or other liquid, without first exposing it to the atmosphere, and leading it into a horizontal or flat coil of pipe of considerable length, through which the liquid has to flow, constantly exposed to the cooling influence of the ice, so that its temperature is gradually reduced on its passage to the outlet.

Figure 1 is a horizontal section taken through the upper portion of the frame of the refrigerator. Fig. 2 is a vertical section of my invention.

A represents an ice-chamber in a refrigerator. In this chamber is an ice-pan, $a$, of galvanized iron or other suitable material, that occupies a shelf to within a short distance of the walls for a passage of air. In the pan lies a flat coil of pipe, $b$, the inner end of which, $c$, is coupled with an induction-pipe, of which the other end is attached to the reservoir that supplies the liquid to be cooled. The outer end of the coil is coupled with an eduction-pipe, $e$, that terminates in a faucet outside of the refrigerator. The couplings between the coil and the pipes $b$ and $e$ are removable by hand to allow the removal of the coil and pan for repairs or other purposes. On the coil $b$ is laid a thin perforated sheet of metal, $f$, and on this the ice is placed; or the coil may be brought in immediate contact with the ice without an intervening sheet; but the former is preferable, owing to the protection it offers to the coil when the ice is put on. It is not indispensably necessary to form a coil of the pipe, for it may be laid flat side by side in parallel lines until the space assigned to it be filled; but for greater convenience and cheapness the coil form is preferred.

Having thus described my invention, I claim—

In a refrigerator, the combination of an ice-chamber, A, provided with an ice-pan, $a$, the pipe $b$, connected at its inner end to a supply-source for the liquid and provided with a cock at its outer end, and the perforated plate $f$, placed on the top of the pipe, substantially as shown.

In testimony whereof I have affixed my signature in presence of two witnesses.

GEORGE C. HODGDON.

Witnesses:
T. F. LEHMANN,
LOUIS MOESER.